United States Patent [19]

Passalenti et al.

[11] 4,100,221

[45] Jul. 11, 1978

[54] UNSATURATED POLYESTER RESIN COMPOSITIONS

[75] Inventors: Beppino Passalenti, Lissone (Milan); Giorgio Brumat, Verano Brianza (Milan); Silvio Vargiu, Casatenovo (Como), all of Italy

[73] Assignee: Societa Italiana Resine S.I.R. S.p.A., Milan, Italy

[21] Appl. No.: 822,170

[22] Filed: Aug. 5, 1977

[30] Foreign Application Priority Data

Aug. 5, 1976 [IT] Italy .............................. 26049 A/76

[51] Int. Cl.$^2$ ............................................... C08L 63/00
[52] U.S. Cl. ................................. 260/835; 260/42.28; 260/830 TW; 260/837 PV
[58] Field of Search ........................................ 260/835

[56] References Cited

U.S. PATENT DOCUMENTS

| | | | |
|---|---|---|---|
| 3,100,758 | 8/1963 | Ravve | 260/836 |
| 3,300,543 | 1/1967 | Turner | 260/835 |
| 3,513,222 | 5/1970 | Speitel | 260/835 |
| 3,786,004 | 1/1974 | Furuya | 260/835 |
| 4,038,339 | 7/1977 | Foster | 260/835 |

FOREIGN PATENT DOCUMENTS 1,915,026   10/1970   Fed. Rep. of Germany ....... 260/835

*Primary Examiner*—Paul Lieberman
*Attorney, Agent, or Firm*—Sughrue, Rothwell, Mion, Zinn and Macpeak

[57] ABSTRACT

Unsaturated polyester resin compositions comprising:
(a) an unsaturated polyester resin,
(b) from 5 to 15 parts by weight for each 100 parts by weight of polyester resin (a), of vinyl chloride polymer, and
(c) from 10 to 20 parts by weight for each 100 parts by weight of polyester resin (a), of an epoxy Novolak resin having an epoxy function higher than 2, or of a mixture of the latter with a liquid epoxy resin in such amount that the average epoxy function of the mixture be higher than 2. These compositions hardenable by means of peroxides have low shrinkage values on hardening and yield hardened products having high resistance to bending and to heat.

8 Claims, No Drawings

UNSATURATED POLYESTER RESIN COMPOSITIONS

The present invention relates to unsaturated polyester resin compositions having low shrinkage values on hardening.

In the following specification, by unsaturated polyester resins, or by polyester resins, are meant the solutions, in an acrylic or vinylic monomer, of the polycondensation product of a mixture comprising polycarboxylic acids and polyhydric alcohols, in which one or the other class of the above compounds is unsaturated.

It is known that unsaturated polyester resins harden under the action of peroxides, and possibly, also, of a hardening accelerator, and that in this change from the liquid to the solid state they show relatively high volume variation, or shrinkage percentage. This phenomenon is disadvantageous in that it is not possible to make perfectly smooth objects, that is, having surfaces without marks, beads, ribs or other defects.

In order to eliminate, or at least to reduce, these disadvantages, recourse has been made in the art to unsaturated polyester resin compositions including a thermoplastic polymer, such as, for example polyvinyl acetate, polyacrylate or methacrylate or polyvinyl chloride.

More particularly, according to a known method, the preselected thermoplastic polymer is dissolved in the acrylic or vinylic monomer (usually styrene) and the polycondensation product is dissolved in the resultant solution.

The hardened products obtained from the resulting compositions are free, or nearly free from surface defects.

Recourse has also been made in the art to unsaturated polyester resin compositions comprising polyvinyl chloride and a liquid epoxy resin, the latter being the reaction product of a diphenol with a chlorohydrin, especially the reaction product of 2,2-bis (4-hydroxyphenyl) propane (bisphenol-A) with epichlorohydrin.

Although it is possible to manufacture products having good surface characteristics with the compositions of the prior art, it is not, however, possible to give to these products high physical-mechanical characteristics, such as, for example, those relating to resistance to bending and to heat.

These disadvantages are overcome by means of the compositions of the present invention.

Thus, the present invention provides an unsaturated polyester resin composition hardenable by means of peroxides, which comprises:
(a) an unsaturated polyester resin,
(b) a vinyl chloride polymer in an amount of from 5 to 15 parts by weight for each 100 parts by weight of unsaturated polyester resin, and
(c) from 10 to 20 parts by weight for each 100 parts by weight of unsaturated polyester resin, of an epoxy Novolak resin having an epoxy function greater than 2, or of a mixture of the latter with a liquid epoxy resin, said liquid epoxy resin being present in the mixture in an amount not exceeding 50% by weight and such that the average epoxy function of the mixture be higher than 2, and said epoxy Novolak resin being the product of the epoxidation with epichlorohydrin of a Novolak phenolic resin chosen from the following classes:

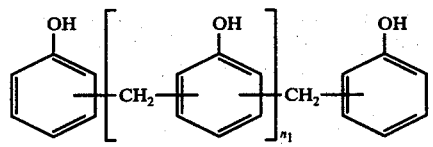

wherein $n_1$ is from 0.2 to 4

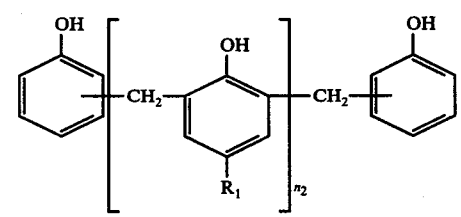

wherein $n_2$ is from 1 to 8 and $R_1$ is an alkyl radical with from 2 to 10 carbon atoms, and

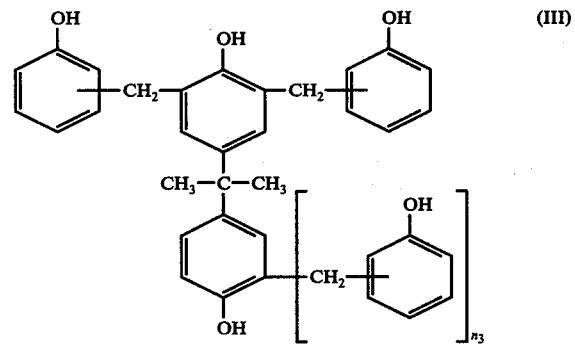

wherein $n_3$ is from 0 to 1.

The unsaturated polyester resins useful for the purposes of the present invention are those, known in the art, which consist of solutions in an unsaturated, liquid, acrylic or vinylic monomer, of the product of the polycondensation of a mixture comprising polycarboxylix acids and polyhydric alcohols, in which one or the other class of the above compounds is unsaturated.

Usually arylvinyl compounds are employed as the unsaturated monomers, and more especially styrene.

The polycondensation product is generally obtained from saturated dihydric alcohols (such as ethylene, propylene, diethylene and dipropylene glycols) and unsaturated dicarboxylic acids (such as maleic, fumaric, itaconic and citraconic acids) or their anhydrides (such as maleic anhydride).

Also useful for the purposes of the present invention are those modified polyesters which are made by adding during polycondensation small amounts of saturated and/or unsaturated compounds chosen from monocarboxylic acids, monohydric alcohols, alcohols with more than two hydroxyl groups per molecule and acids with more than two carboxyl groups per molecule.

Finally the unsaturated bicarboxylic acids may be partially replaced by equivalent amounts of saturated carboxylic acids or their anhydrides such as succinic, adipic, azelaic and phthalic acids and phthalic anhydride.

The acrylic or vinylic monomer is generally used in an amount of from 30 to 65 parts by weight, and preferably from 30 to 50 parts by weight for every 100 parts by weight of polyester resin.

Moreover the said polycondensation product advantageously has an acid value of from 18 to 25 and a Gardner viscosity of V, as measured at 25° C in a 35% by weight solution in styrene.

The Novolak phenolic resins corresponding to formula (I) may be obtained by the condensation reaction of phenol with formaldehyde in the presence of an acid catalyst, operating at a pressure equal to, or higher than atmospheric.

The Novolak resins (II) may be obtained by a process which comprises the following series of steps:

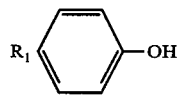

formaldehyde and a para-substituted phenol
are brought into contact in a molar ratio of at least 2:1, and reacted in the presence of an inorganic base and at a temperature of at least 40° C, thereby to form the dimethylol derivative of said phenol;
an acid is added to the reaction products of the preceding step, in an amount at least equivalent to that of the inorganic base fed in in said preceding step, and the dimethylol derivative is recovered;
phenol and the dimethylol derivative are brought into contact in a molar ratio of at least 2:1, and reacted in the presence of an acid catalyst at a temperture of at least 100° C, distilling off the water being formed, until the methylol groups are substantially completely reacted;
the resulting Novolak phenolic resin (II) is recovered from the reaction products of the preceding step.

The Novolak resins (III) may be prepared according to the precedure described in German Patent Application Publication No. 26 48 062.

The epoxy Novolak resins useful for the purposes of the present invention may be obtained by epoxidising the Novolak phenolic resins (I), (II) or (III) with epichlorohydrin in the presence of an alkali metal hydroxide.

For this purpose the selected Novolak phenolic resin is dissolved in epichlorohydrin, maintaining the ratio of the number of moles of epichlorohydrin to the number of phenolic hydroxyl groups of Novolak phenolic resin at a value of from 2.5:1 to 12:1, and aqueous alkali metal hydroxide is gradually added to the said solution until the number of moles of the said alkali metal hydroxide is equivalent, or practically equivalent to the number of phenolic hydroxyl groups of Novolak phenolic resin.

The reaction is preferably carried out at a temperature of from 60° to 80° C during the addition of the alkali metal hydroxide, the water being continuously distilled off from the reaction medium in the form of an azeotropic mixture with epichlorohydrin and the distilled epichlorohydrin being recycled, while maintaining at every instant the water content of the reaction medium at a value of from 0.5 to 2.5% by weight and the pH at a value of from 7 to 8. After the addition of the aqueous alkali metal hydroxide the residual water is completely distilled off from the reaction medium and the epoxy Novolak resin is recovered.

In each case the epoxy Novolak resins useful for the purposes of the present invention have characteristics typically within the following ranges of values:

| | |
|---|---|
| Epoxy equivalent: | 165 – 185 |
| Viscosity in cps at 25° C in a 70 wt.% solution in ethylene glycol monobutyl ether: | 170 – 250. |

It is essential for the purposes of the present invention that the expoxy function of the epoxy Novolak resin or of the aforesaid mixture be greater than 2, and preferably greater than 2.2, thus differing from the compositions of the prior art which comprise a liquid epoxy resin.

As already stated the epoxy Novolak resin may be partially replaced by a liquid epoxy resin, particularly by the liquid diepoxide obtained from bisphenol-A and epichlorohydrin, defined by the following general formula:

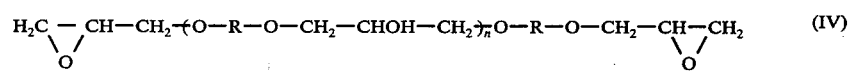

where R is the bisphenyl radical of bisphenol-A, and $n$ has a value of from 0 to about 1.

It is possible to replace up to 50% by weight of the epoxy Novolak resin by liquid epoxy resin, taking into account that the higher the epoxy function of the epoxy Novolak resin, the higher can be the percentage of liquid epoxy resin.

The vinyl chloride polymer is generally polyvinyl chloride, or else a copolymer of vinyl chloride with minor amounts (generally up to 15–20 wt.%) of other monomers which can be copolymerised with it, such as, for example maleic anhydride, allyl alcohol and vinylidene chloride.

The composition of the present invention preferably contains from 5 to 10 parts by weight of component (b) and from 10 to 15 parts by weight of component (c) for every 100 parts by weight of component (a).

The composition of the present invention may be prepared by dissolving the components (b) and (c) in the acrylic or vinylic monomer, and adding to the solution thus obtained, either the unsaturated polyester, or else a solution of the latter in the acrylic or vinylic monomer.

The composition may comprise an oxide of an alkaline earth metal, such as magnesium oxide, in an amount of from 0.5 to 3 parts by weight for every 100 parts by weight of the sum of components (a), (b) and (c). The function of this alkaline earth metal oxide is to induce an increase in viscosity such as to render the composition suitable for compression moulding.

Other components which may be present in the composition are inert fillers (such as glass fibre and calcium carbonate), lubricants (such as zinc stearate), dyes and pigments. These last compounds may be present in an amount of from 100 to 300 parts by weight for each 100 parts by weight of the sum of components (a), (b) and (c).

The composition of the invention hardens under the action of organic peroxides or hydroperoxides, such as methyl ethyl ketone peroxide, cyclohexanone peroxide, benzoyl peroxide and cumene hydroperoxide.

The peroxides or hydroperoxides are generally added in an amount of from 1 to 2 parts by weight, and preferably from 0.8 to 1.2 parts by weight for each 100 parts by weight of the sum of components (a), (b) and (c).

Hardening accelerators such as dimethylaniline and trimethylbenzylammonium chloride may be added to the composition in an amount of from 0.1 to 2 parts by weight for each 100 parts by weight of the sum of components (a), (b) and (c). It is also possible to use as accelerators the salts of metals such as cobalt and vanadium, especially cobalt, vanadium or vanadyl naphthenates and octoates, in amounts of from 0.02 to 2 parts by weight (as metal) for each 100 parts by weight of the sum of components (a), (b) and (c).

The peroxides and the accelerators are generally added immediately before hardening the composition.

During hardening of the compositions of the present invention, manufactured articles are obtained with very low shrinkage values and having improved mechanical characteristics, especially as regards resistance to bending and to heat.

Example 1

Into a flask furnished with a condenser, an agitator, a thermometer and a device for introducing an inert gas, are loaded maleic anhydride and propylene glycol in a molar ratio of 1:1.1. The mixture is polycondensed at temperatures of 190°–200° C until an acid value of about 20 is reached.

The reaction mixture is then cooled to 120° C and styrene containing 20 ppm of hydroquinone is added until the styrene content of the resultant unsaturated polyester resin is equal to 35% by weight.

The characteristics of the resin are summarized in Table 1.

Table 1

| | |
|---|---|
| Hazen colour | 80 |
| Viscosity at 25° C (cps) | 980 |
| Acid value | 20 |
| Gel time at 25° C (minutes) | 12 |
| Gel time SPI (minutes) | 3.75 |
| Peak exotherm temperature (° C) | 206 |
| Time to peak exotherm (minutes) | 4.66 |

In the preceding tests:

The gel time is determined in the following way:

100 grams of unsaturated polyester resin are weighed into a small beaker, and there are added 0.2 ml of cobalt octoate solution containing 6% by weight of metallic cobalt. The whole is homogenized and the beaker is immersed in a bath thermostatically maintained at 25° C, maintaining the level of the composition 1 cm below the level of the liquid in the bath.

1.5 ml of methyl ethyl ketone peroxide (strength 50% by weight) are then added, the mass is homogenized and the chronometer is started.

Gel time is defined as the time which elapses between homogenisation of the resin with the peroxide and the moment at which the composition taken up on a glass rod comes away from it.

Gel time SPI indicates the time in which the temperature of the unsaturated polyester resin homogenized with the peroxide rises from 65.6° C to 87.8° C, when the temperature of the bath is at 82.2° C.

The maximum temperature reached is also shown as the "isothermic peak" or "peak exotherm temperature", and the time necessary for the temperature to rise from 65.6° C to the Peak exotherm temperature is also recorded.

Example 2

The solutions in styrene, S1 to S5, are prepared from the various polymers listed in Table 2.

The composition of the solutions S1 to S5, in parts by weight, is shown in Table 2.

Table 2

| | S1 | S2 | S3 | S4 | S5 |
|---|---|---|---|---|---|
| Polyvinyl chloride | 21 | 21 | 21 | 21 | — |
| Liquid epoxy resin | 32 | — | 16 | 8 | 32 |
| Novolak epoxy resin | — | 32 | 16 | 24 | — |
| Halogenated polyethylene | — | — | — | — | 21 |
| Styrene | 47 | 47 | 47 | 47 | 47 |

In the solutions of Table 2:

The polyvinyl chloride used is that obtained by the emulsion technique for the production of pastes and it has a grain size of 1–50 microns and a K value equal to 67.

The liquid epoxy resin used is the product of the condensation of bisphenol-A with epichlorohydrin, and it has a viscosity of 97000 cps and an epoxy equivalent of 185.

The Novolak epoxy resin used is the product of the epoxidation with epichlorohydrin of the Novolak phenolic resin (1) with $n_1$ equal to 2.5, and has a viscosity of 220 cps, as measured at 25° C in a 70% solution in ethylene glycol monobutyl ether, and an epoxy equivalent of 180.

The halogenated polyethylene used has the following characteristics: chlorine content 65% by weight and viscosity of 1500 cps, as measured at 25° C in a 20 wt.% solution in toluene.

The compositions, from C1 to C5, including the unsaturated polyester resin in Example 1 and each of the solutions from S1 to S5 previously described are prepared.

The constituents of the said compositions and their amounts in parts by weight are shown in Table 3.

Table 3

| | C1 | C2 | C3 | C4 | C5 |
|---|---|---|---|---|---|
| Polyester resin of Example 1 | 60 | 60 | 60 | 60 | 60 |
| Solution S1 | 40 | — | — | — | — |
| Solution S2 | — | 40 | — | — | — |
| Solution S3 | — | — | 40 | — | — |
| Solution S4 | — | — | — | 40 | — |
| Solution S5 | — | — | — | — | 40 |
| Zinc stearate | 7.5 | 7.5 | 7.5 | 7.5 | 7.5 |
| tert-butyl perbenzoate | 1.0 | 1.0 | 1.0 | 1.0 | 1.0 |
| Calcium carbonate | 150 | 150 | 150 | 150 | 150 |
| Glass Fibre (chopped strand) | 108 | 108 | 108 | 108 | 108 |
| Magnesium oxide | 1.2 | 1.2 | 1.2 | 1.2 | 1.2 |

The compositions from C1 to C5 are moulded by compression under the following conditions: temperature 150° C, pressure 60 Kg/cm$^2$, time: 60, 90 and 120 seconds.

In Table 4 are shown the characteristics of the hardened products (laminates).

Table 4

| | C1 | C2 | C3 | C4 | C5 |
|---|---|---|---|---|---|
| Barcol hardness | | | | | |
| 60" | 35 | 47 | 42 | 45 | 43 |
| 90" | 38 | 49 | 45 | 47 | 45 |
| 120" | 42 | 52 | 47 | 50 | 48 |
| Linear shrinkage % | | | | | |
| 60" | 0.16 | 0.20 | 0.18 | 0.20 | 0.15 |
| 90" | 0.13 | 0.16 | 0.15 | 0.14 | 0.14 |
| 120" | 0.10 | 0.14 | 0.12 | 0.11 | 0.12 |

Table 4-continued

| | C1 | C2 | C3 | C4 | C5 |
|---|---|---|---|---|---|
| Bending strength (Kg/cm$^2$) | | | | | |
| 60" | 800 | 990 | 900 | 950 | 750 |
| 90" | 910 | 1030 | 950 | 1000 | 880 |
| 120" | 830 | 950 | 880 | 900 | 810 |

Example 3

The compositions C6 and C7, including the polyester resin of Example 1 and the solutions S1 and S2 described in Example 2 are prepared.

The constituents of the compositions with their parts by weight are shown in Table 5.

Table 5

| | C6 | C7 |
|---|---|---|
| Polyester resin of Example 1 | 60 | 60 |
| Solution S1 | 40 | — |
| Solution S2 | — | 40 |
| Zinc stearate | 7.5 | 7.5 |
| tert-butyl perbenzoate | 1.0 | 1.0 |
| Calcium carbonate | 150 | 150 |
| Glass fibre (chopped strand) | 108 | 108 |
| Magnesium oxide | 2.5 | 2.5 |

The compositions C6 and C7 are moulded under the following conditions: hardening time 120 seconds, temperature 150° C and pressure 60 Kg/cm$^2$.

In Table 6 there are shown the characteristics of the hardened (laminated) products without conditioning and after conditioning for 24 hours and 200 hours at 150° C.

Table 6

| Composition | C6 | C6 | C6 | C7 | C7 | C7 |
|---|---|---|---|---|---|---|
| Conditioning at 150° C (hours) | 0 | 24 | 200 | 0 | 24 | 200 |
| Bending strength (Kg/cm$^2$) | 950 | 1200 | 770 | 940 | 1100 | 1300 |
| Linear shrinkage (%) | 0.12 | 0.11 | 0.21 | 0.13 | 0.12 | 0.20 |
| Shore hardness D | 82 | 85 | 85 | 83 | 84 | 85 |
| Barcol hardness | 56 | 67 | 69 | 56 | 69 | 70 |
| Gloss | 35 | 30 | 28 | 30 | 29 | 28 |

What we claim is:

1. An unsaturated polyester resin composition hardenable by means of peroxides, which comprises:
   (a) an unsaturated polyester resin,
   (b) a vinyl chloride polymer in an amount of from 5 to 15 parts by weight for each 100 parts by weight of unsaturated polyester resin, and
   (c) from 10 to 20 parts by weight for each 100 parts by weight of unsaturated polyester resin, of an epoxy Novolak resin having an epoxy function greater than 2, or of a mixture of the latter with a liquid epoxy resin, said liquid epoxy resin being present in the mixture in an amount not exceeding 50% by weight and such that the average epoxy function of the mixture be higher than 2, and said epoxy Novolak resin being the product of the epoxidation with epichlorohydrin of a Novolak phenolic resin chosen from the following classes:

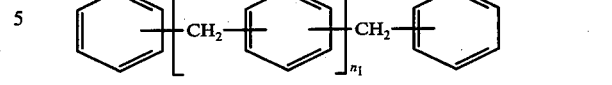

wherein $n_1$ is from 0.2 to 4

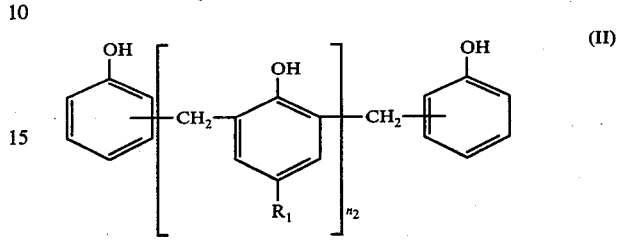

wherein $n_2$ is from 1 to 8 and $R_1$ is an alkyl radical with from 2 to 10 carbon atoms, and

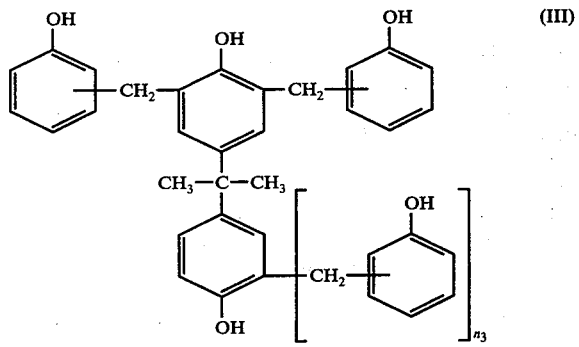

wherein $n_3$ is from 0 to 1.

2. The composition of claim 1, wherein said component (a) is a solution in an unsaturated acrylic or vinylic monomer, of the polycondensation product of a mixture comprising one or more polycarboxylic acids and one or more polyhydric alcohols, in which one or the other class of the above compounds is unsaturated, the said polycondensation product having an acid value of from 18 to 25 and a Gardner viscosity V, as measured at 25° C in a 35 wt.% solution in styrene.

3. The composition of claim 2, wherein said unsaturated monomer is styrene.

4. The composition of claim 1, wherein said epoxy Novolak resin has an epoxy equivalent of from 165 to 185 and a viscosity of from 170 to 250 cps, as measured at 25° C in a 70 wt.% solution in ethylene glycol monobutyl ether.

5. The composition of claim 1, in which said component (b) is polyvinyl chloride or a copolymer of vinyl chloride with small amounts of other monomers selected from the group consisting maleic anhydride, allyl alcohol and vinylidene chloride.

6. The composition of claim 1, wherein said liquid epoxy resin is an epichlorohydrin-bisphenol A resin.

7. The composition of claim 1, which comprises from 0.5 to 3 parts by weight of oxide of alkaline earth metal for each 100 parts by weight of the sum of components (a), (b) and (c).

8. The composition of claim 1, which comprises from 100 to 300 parts by weight of inert fillers, lubricants, dyes and/or pigments for each 100 parts by weight of the sum of components (a), (b) and (c).

* * * * *